United States Patent [19]

Imoto

[11] Patent Number: 4,588,289

[45] Date of Patent: May 13, 1986

[54] DOCUMENT SIZE READING DEVICE FOR CONTINUOUSLY VARIABLE MAGNIFICATION TYPE COPYING MACHINE

[75] Inventor: Manabu Imoto, Tokyo, Japan

[73] Assignee: Asahi Kogaku Kogyo Kabushiki Kaisha, Tokyo, Japan

[21] Appl. No.: 654,913

[22] Filed: Sep. 27, 1984

[30] Foreign Application Priority Data

Nov. 5, 1983 [JP] Japan .................................. 58-207984

[51] Int. Cl.$^4$ ....................... G03B 27/34; G03B 27/40; G03B 27/70

[52] U.S. Cl. .......................................... 355/57; 355/61

[58] Field of Search ......................... 355/75, 56, 57, 61

[56] References Cited

U.S. PATENT DOCUMENTS 4,338,020 7/1982 Yukawa et al. .................. 355/75 X

FOREIGN PATENT DOCUMENTS 126042 9/1979 Japan ..................................... 355/57

*Primary Examiner*—Richard A. Wintercorn

*Attorney, Agent, or Firm*—Sughrue, Mion, Zinn, Macpeak & Seas

[57] ABSTRACT

An original's size reading device for use in a continuously variable magnification type copying machine which automatically reads the size of an original placed on an original platen so that it is unnecessary to perform manual operations or calculations to adjust the magnification setting or copy size. A first mirror receiving a light beam from the original is provided below the stationary original platen with the first mirror being movable parallel to the platen. A light beam reflected from the first mirror is applied through a second mirror and a magnification varying optical system to the photosensitive element of the copying machine. The original's size reading device employed in this copying machine includes an original's edge detector for detecting the size of the original in association with the movement of a moving unit on which the first mirror is fixedly installed.

5 Claims, 7 Drawing Figures

DOCUMENT SIZE READING DEVICE FOR CONTINUOUSLY VARIABLE MAGNIFICATION TYPE COPYING MACHINE

BACKGROUND OF THE INVENTION

The present invention relates to a device for sensing the size of an original document in a continuously variable magnification type copying machine.

In this type of copying machine, it is sometimes required to magnify the size of an original of other than a standard size to make a copy on a sheet of paper of a standard size. In these cases, heretofore, the magnification has been set by manually measuring the size of the original and calculating the ratio of the size of the original to the selected copy size. Alternatively, the magnification can be changed until the necessary magnification is obtained while test copying operations are repeatedly carried out. However, if the size of an original can be read automatically, then the necessary magnification can be automatically determined from the size of the copy sheet. That is, it is unnecessary to perform calculations or to use test copies.

Also, if it is required to provide a copy having a certain size when using a continuously variable magnification type copying machine, it is necessary to determine the appropriate magnification setting to achieve this copy size. However, in this case also, for the conventional copying machine there is no way other than to perform calculations as above or to make test copies, similar to the above-described case.

SUMMARY OF THE INVENTION

Accordingly, an object of the invention is to provide an original size reading device which automatically reads the size of an original placed on the platen.

In accordance with the above and other objects, the invention provides a continuously variable magnification type copying machine with a stationary platen in which a first mirror for receiving a light beam reflected from an original on the platen is provided below the platen. The first mirror is movable parallel to the platen. A light beam reflected from the first mirror is applied through a second mirror and a magnification varying optical system to a photosensitive element. A detector for detecting the edge of the original is provided on a moving unit on which the first mirror is fixedly mounted. The edge detector is used to detect the size of an original on the platen in association with the movement of the moving unit. When a copying sheet's size has been set with priority, the detected original size is applied to a magnification calculating circuit for setting the magnification. When a copying magnification has been determined with priority, the original's size is applied to an indication device to indicate the size of the copy.

DESCRIPTION OF THE PREFERRED EMBODIMENTS

The invention will now be described in detail with reference to a preferred embodiment shown in the accompanying drawings.

Figure 1:
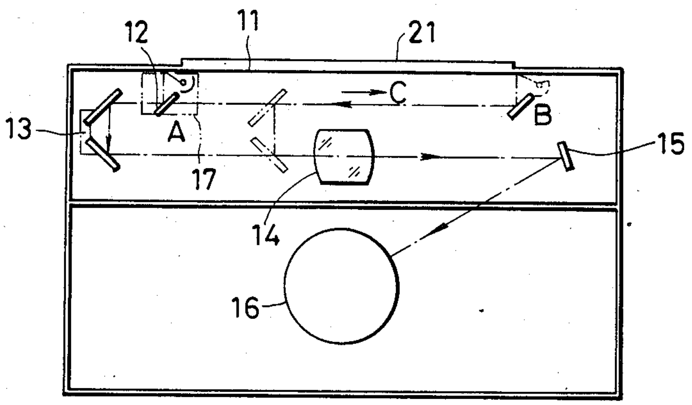
FIG. 1 is a side view schematically showing the arrangement of a continuously variable magnification type copying machine.

FIG. 1 is an explanatory diagram outlining the arrangement of a copying machine having a fixed platen. A first movable mirror 12, a pair of second movable mirrors 13, a magnification varying optical system (zoom lens) 14, a stationary mirror 15, and a photosensitive drum 16 are arranged below the platen 11. The first mirror 12, together with an original illuminating lamp 18, is fixedly installed on a moving unit 17, which moves from its original position A to a final position B along a line parallel to the platen 11 as indicated by an arrow C. While the moving unit 17 moves in the direction of the arrow C, the second mirrors 13 are moved in the same direction at half the speed of the moving unit 17.

The second mirrors 13 change by 180° the direction of a light beam which has been reflected by the first mirror 12. The reason why the speed of the second mirror 13 is half the speed of the first mirror 12 is that it is necessary to maintain unchanged the length of the optical path between the platen 11 and the magnification varying optical system 14. In the optical system 14, the positions of its lens groups and the distances therebetween are changed according to the selected magnification. The light beam passing through the optical system 14 is applied to the photosensitive drum 16 after being reflected by the stationary mirror 15. As a result, a latent image is formed on the photosensitive drum 16. The latent image thus formed is utilized to provide a copy of the original.

Figure 2:
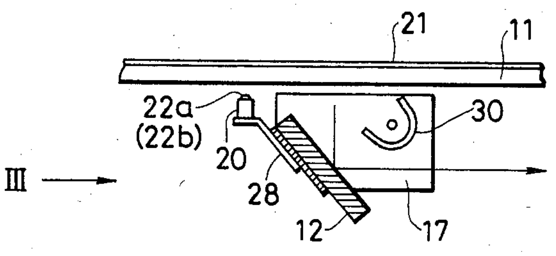
FIG. 2 is a side view of a moving unit in an example of a size reading device according to the invention.
Figure 3:
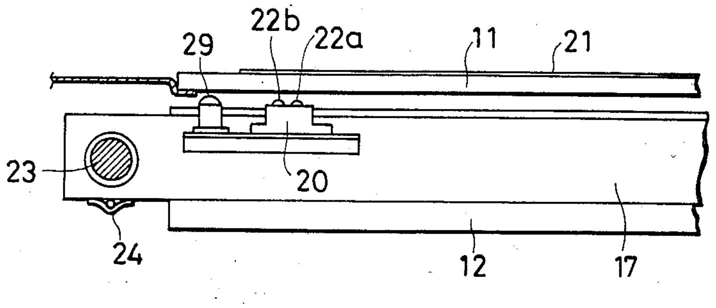
FIG. 3 is a view taken in the direction of an arrow III in FIG. 2.
Figure 4:
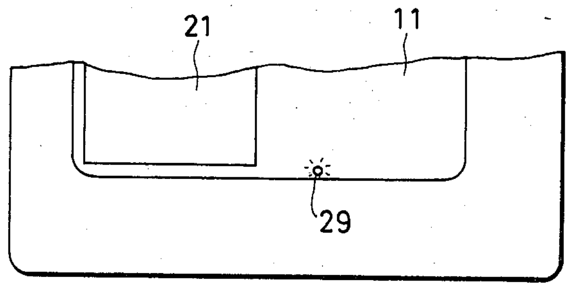
FIG. 4 is a plan view used for a description of the operation of the moving unit in FIGS. 2 and 3.

The size reading device according to the invention includes an edge detector 20 as shown in FIGS. 2, 3 and 4 in detail. The detector 20 operates as follows: The moving unit 17 is moved before the copying operation so that, in association with the movement of the moving unit 17, the detector 20 detects the edges (ends) of the original 21 on the platen 11. The detector 20 is a light reflection type detector composed of a light-emitting element **22*a* and a light-detecting element 22*b*. To detect the edges of the original, the light-detecting element 22*b* detects whether or not a light beam emitted from the light-emitting element 22*a* is reflected by the original 21**.

Figure 5:
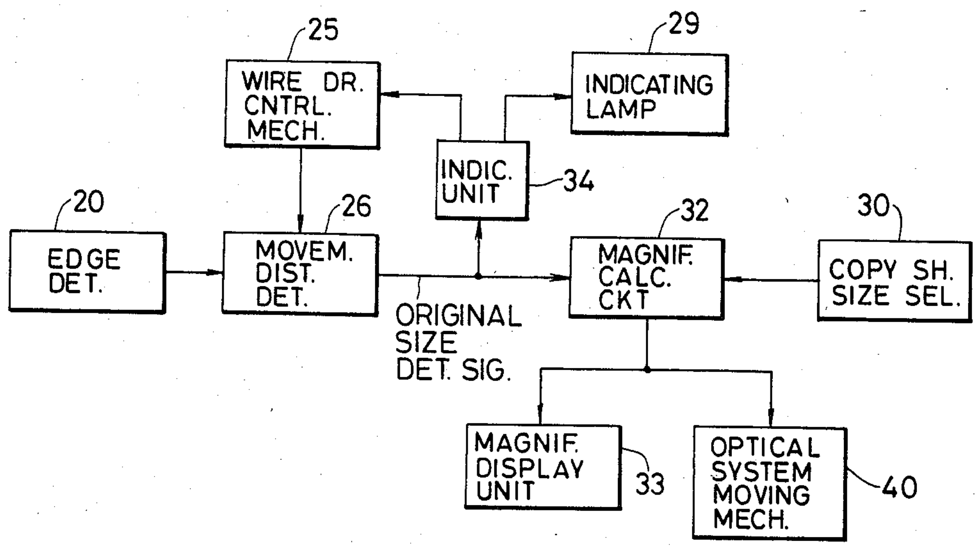
FIGS. 5 and 6 are block diagrams used for a description of the operations of a circuit utilizing the size reading device of the invention.
Figure 6:
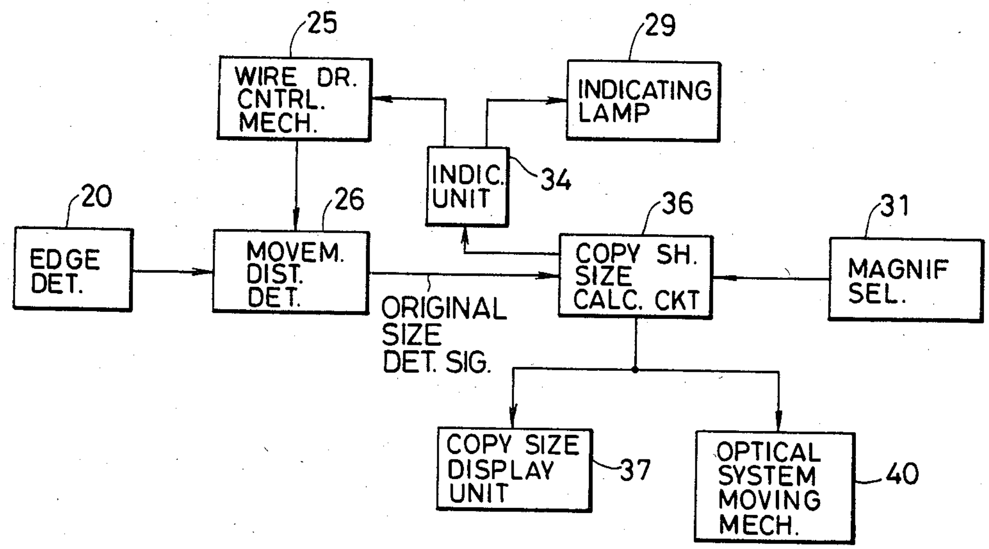

In FIG. 3, reference numeral 23 designates a guide bar for the moving unit 17, and reference numeral 24 indicates a drive wire fastened to the moving unit 17. The drive wire 24 is driven by a wire drive control mechanism 25 as shown in FIG. 5 or FIG. 6, and the distance of movement of the drive wire 24, that is, the distance of movement of the moving unit 17, is detected by a movement distance detector 26. Upon reception of an edge detection signal from the edge detector 20, the movement distance detector outputs a size detection signal. The movement distance detector 26 may employ a conventional arrangement. However, if the wire drive control mechanism 25 includes a rotor, the movement distance detector 26 may be implemented with a rotary encoder for detecting the rotational angle of the rotor. In FIGS. 2 and 3, reference numeral 28 designates a bracket for supporting the edge detector 20. The supporting bracket 28 is secured to the moving unit 17. An indicator 29 for indicating the size of the copy is also mounted on the supporting bracket. Further in FIG. 2, reference numeral 30 designates a reflecting plate for an original illuminating lamp 18.

The copying machine thus constructed operates as follow: First, an original 21 is placed on the platen 11. Then, the moving unit 17 is moved in response to a suitable drive signal prior to the copying operation. As a result, the distance of movement of the moving unit 17 is detected by the movement distance detector 26, and the edges of the original 21 are detected by the edge detector 20. Accordingly, the size of the original 21 can be automatically detected from the timing of the output signals of the edge detector 20 as applied to the movement distance detector 26. In the case where the size of copying sheet has been set, the size detection signal can be used for the calculation of the magnification and for indicating the copy's size, the latter operation being carried out by turning on the indicating lamp 29. On the other hand, in the case where the magnification has been set, the size detection signal can be used for indicating the copy's size, which operation is conducted by turning on the indicating lamp.

More specifically, FIGS. 5 and 6 show control block diagrams for the copy-sheet-size-priority operation and the magnification-priority operation, respectively. After placing an original 21 on the platen 11, the operator either inputs a copying sheet size with a copying sheet size selector 30 or inputs a copying magnification with a copy magnification selector 31. These selectors 30 and 31 may be of the keyboard type which is well known in the art.

When the copying sheet's size is inputted, the operation performed is to magnify the size of the original to a standard size. Then, the wire drive control mechanism 25 composed of pulleys, servo motors and motor control circuit in the well known arrangement will operate to start movement of the moving unit 17 carrying thereon the edge detector 20. The movement distance detector 26 made up of the well known rotary encoder is connected to the wire drive control mechanism 25 to continuously detect the movement distance of the moving unit 17. When the end of the original 21 is detected by the end detector 20, an output signal of the same is inputted into the movement distance detector 26. At this time, a value representative of the movement distance is temporarily held. In other words, this value is also representative of the size of the original 21. The size detecting signal is inputted into the magnification calculating circuit 32 which may be composed of a microprocessor well known per se. In the magnification calculating circuit 32, a necessary magnification is to be calculated in accordance with the size detecting signal and the standard or predetermined copying sheet size.

Also, at the same time, the size detecting signal is applied to the indication unit 34. The indication unit 34 applies to the wire drive control mechanism 25 a signal which causes the moving unit 17 to move to a position corresponding to the desired copying size. Also, after the moving unit 17 has been moved, the indication unit 34 applies to the indicating lamp 29 a signal for lighting the indicating lamp 29. Therefore, the indicating lamp 29 is lighted from below the platen 11 as shown in, for example FIG. 4, and the operator may visually confirm the lighting position and note the copy size. A magnification signal calculated by the magnification calculating circuit 32 is applied to the magnification display circuit 33 and the optical system moving mechanism 35.

The magnification display circuit 33 may be made up of a known seven segment indicator for indicating values. The operator may visually confirm the copying magnification. The optical system moving mechanism 40 is used for moving the variator optical system 14 to the position of the copying magnification and may be composed of, in known combination, for example, a pulse motor and a circuit for converting the magnification signal into a pulse number. When the calculated magnification is in the available range of the copying machine, the variator optical system 14 is moved so that copying may be attained at that magnification.

On the other hand, in the case where a copying magnification is inputted with priority as shown in FIG. 6, the copying magnification is applied to the optical system moving mechanism 40 and the copying sheet size calculation circuit 36 which may be made up of a microprocessor well known per se in the art. In the same manner as in the copying-sheet-size-priority operation, the wire drive control mechanism 25 will operate. Then, the edge of the original 21 is detected by the edge detector 20 to generate a signal which is to be fed to the movement distance detector 26. The thus obtained original size detecting signal is applied to the copying sheet size calculating circuit 36. The copying sheet size calculating circuuit 36 calculates the copy's size in accordance with the original sheet size detecting signal and the predetermined copying magnification. The calculated copy's size is applied to the indication circuit 34. The indication circuit 34 applies to the wire drive control mechanism 25 a signal for moving the moving unit 17 to a position corresponding to the copy's size. After the moving unit 17 is moved, the indication circuit 34 applies a signal to the indicating lamp 29 for lighting the same. Therefore, the indicating lamp 29 is lighted from below the platen 11 as shown in, for example, FIG. 4, and the operator may visually confirm the lit position and note the copy's size. Also, the copying sheet size calculating circuit selects the standard copying sheet suitable for the copying size and applies to a copying sheet size display unit 37 such a signal. The copying sheet size display unit 37 indicates the sheet size, such as A4 or B3. The operator may visually confirm such display and may use a standard size copying sheet suitable for the copying size.

Figure 7:
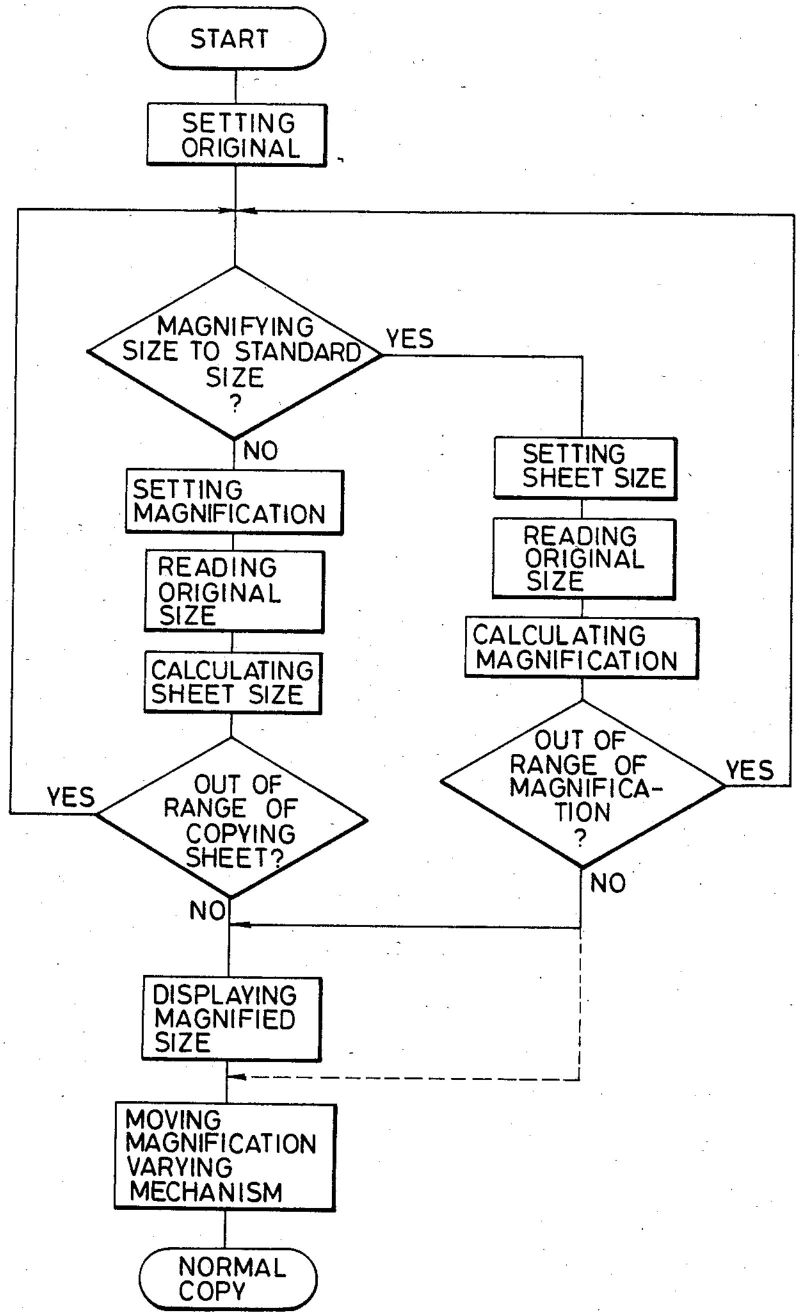
FIG. 7 is a flowchart showing the operations of the device of the invention.

FIG. 7 is a flowchart of the operation of the dual function copying machine, having both copying sheet size priority and copying magnification priority. After the operator places the original 21 on the platen 11, the copying sheet size is inputted with the copying size selector 30 or the copying magnification is inputted with the copying magnification selector 31. The input of the copying sheet size changes the magnification to the corresponding standard size. Then, the moving unit 17 commences moving. The original size is read out as described before. The magnification calculation circuit 32 calculates the magnification in accordance with the original size and the copy's size. When the calculated magnification is out of the available range, the operator must again conduct the inputting operation. When the calculated magnification is in the available range, the moving unit 17 is moved to the position corresponding to the copying size and the indicating lamp 29 is lighted. Then, the magnification display unit 33 indicates the magnification. The optical system moving mechanism 40 operates to thereby position the variator optical system 14 at the calculated magnification. In this case, since magnification to the standard size is carried out, it is possible to omit the display of the size by the indicating lamp 29. This operation example is shown by the dotted lines in FIG. 7.

When the copying magnification is preset, the original size is read out in the same manner as in the previous case, and the copying sheet size calculating circuit 36 calculates the copy's size in accordance with the copying magnification and the original size. When the copying size is out of the available range, the operator must again conduct the inputting operation. When the copying size is in the available range, the moving unit 17 is moved to the position corresponding to the copy's size and the indicating lamp 29 is lighted. Then, the optical system moving mechanism 40 operates and set the variator optical system 14 at the set magnification.

As is apparent from the above-description, in the size reading device according to the invention, the edge detector is installed on the first mirror moving unit which is movable below the platen, and the original's edges are detected in association with the movement of the moving unit to read the size of the original. This reading device can automatically read the size of an original. Accordingly, when the reading device is used to select a magnification where a copying sheet's size has been determined or to indicate a copy's size where a magnification has been determined, it is unnecessary to calculate the copying magnification or to calculate the copy's size, and furthermore it is unnecessary to use test copies. Thus, the employment of the size reading device of the invention promotes maximum effective use of a continuously variable magnification type copying machine.

I claim:

1. In a continuously variable magnification type copying machine in which a first mirror for receiving a light beam reflected from an original on a stationary platen is provided below said stationary platen in such a manner that said first mirror is movable parallel to said platen, and wherein a light beam reflected from said first mirror is applied through a second mirror and a magnification varying optical system to a photosensitive element, the improvement comprising a size reading device comprising an edge detector for detecting the size of an original on said platen, at least a portion of said edge detector being movable with said first mirror, and means for detecting the amount of movement of said edge detector.

2. The copying machine as claimed in claim 1, wherein said edge detector comprises a light reflection type detector emitting light towards said platen and said original to detect edges of said original on said platen from light refected from said original.

3. The copying machine as claimed in claim 1, including means for giving priority to one of a magnification value of said optical system or a size of a copying sheet, and wherein, in the case where a copying sheet size is set with priority, a size detection signal outputted by said edge detector is applied to a copying magnification calculating circuit to determine a copying magnification.

4. The copying machine as claimed in claim 1, including means for giving priority to one of a magnification value of said optical system or a size of a copying sheet, and wherein, in the case where the magnification is set with priority, a size detection signal outputted by said edge detector is applied to an indication unit to indicate a copy size.

5. The copying machine as claimed in claim 4, wherein said indication unit comprises:

- a light-emitting element provided on a moving unit on which said first mirror is fixedly installed;
- movement control means for moving said moving unit to a position corresponding to a copy size; and
- a lighting circuit for turning on said light-emitting element when said moving unit has been moved to said position.

* * * * *